No. 690,791. Patented Jan. 7, 1902.
B. W. SWEET.
GOLD SEPARATING MACHINE.
(Application filed Feb. 20, 1899.)
(No Model.) 3 Sheets—Sheet 1.
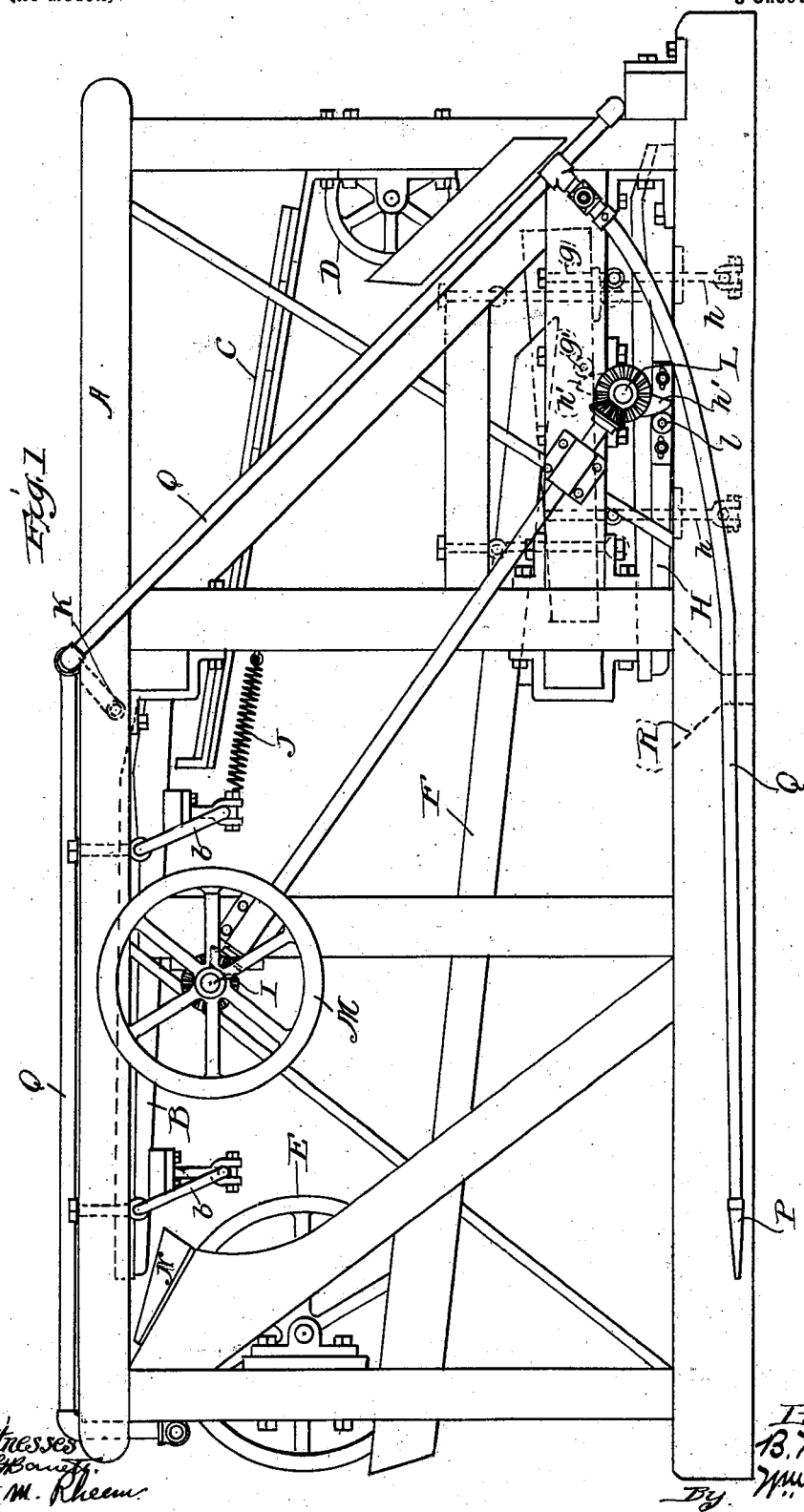
Witnesses
Inventor:
B. W. Sweet
By Wm. C. Belt, Atty.

No. 690,791. Patented Jan. 7, 1902.
B. W. SWEET.
GOLD SEPARATING MACHINE.
(Application filed Feb. 20, 1899.)
(No Model.) 3 Sheets—Sheet 2.
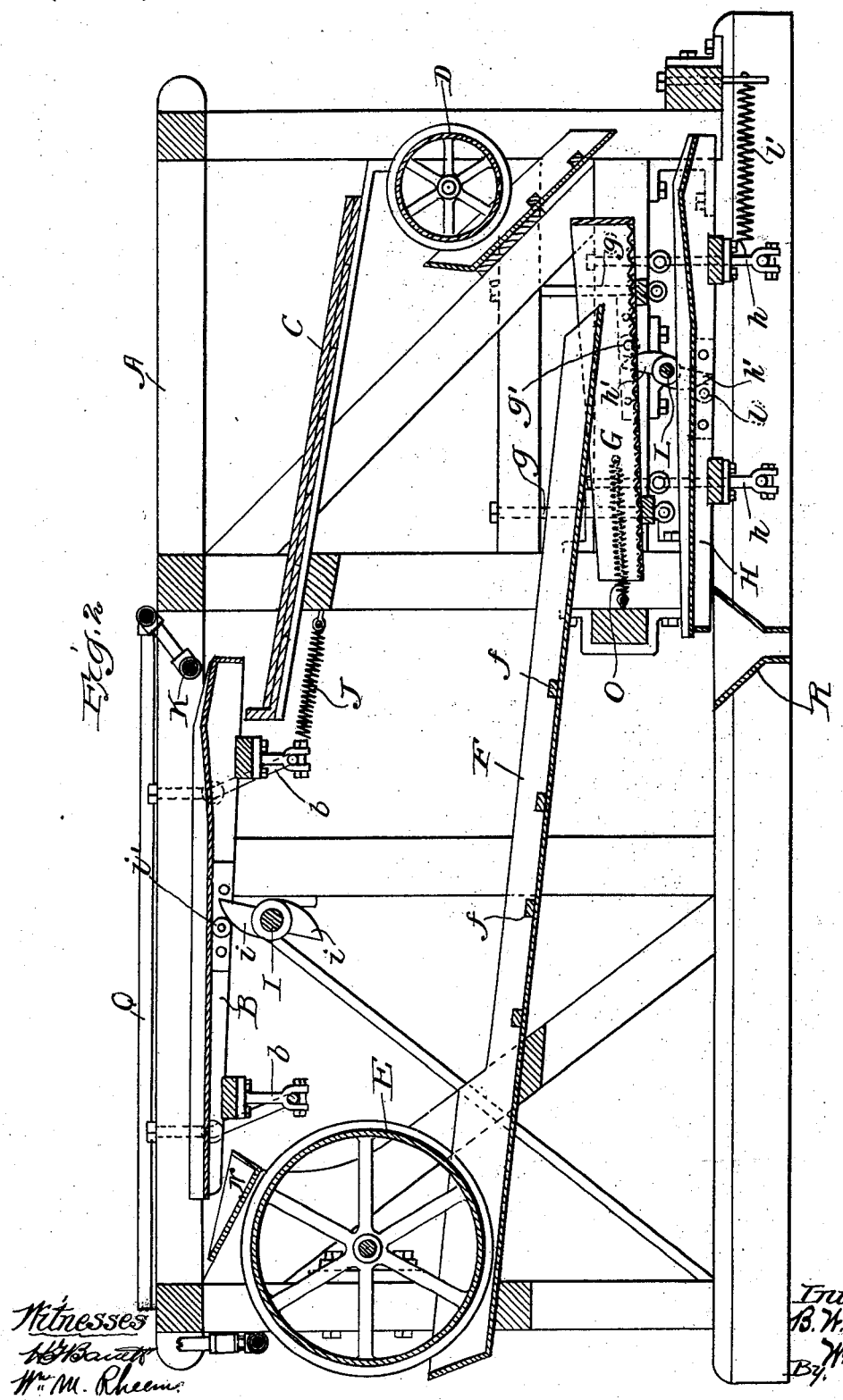

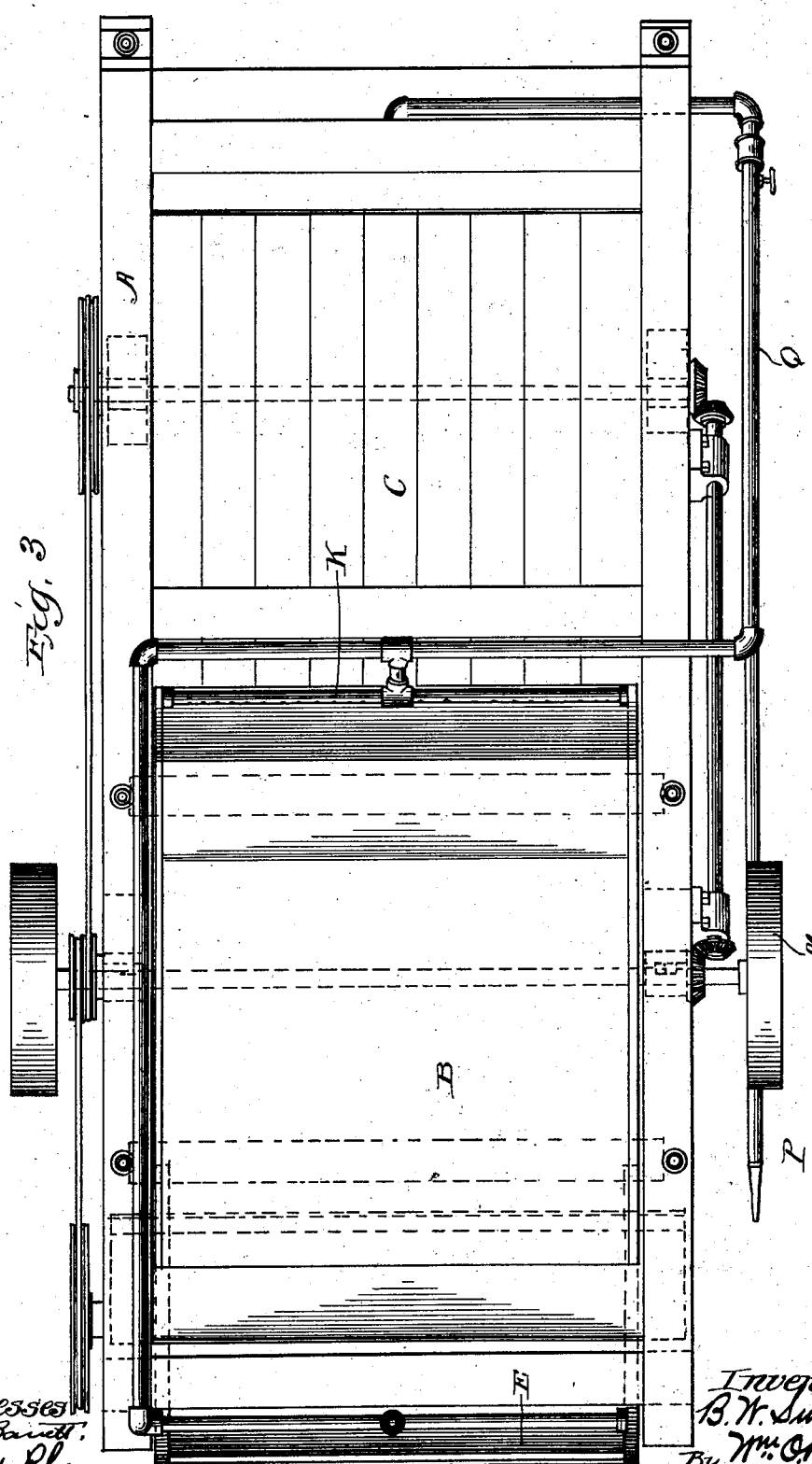

UNITED STATES PATENT OFFICE.

BENJAMIN W. SWEET, OF DENVER, COLORADO, ASSIGNOR TO J. PLATT UNDERWOOD, OF CHICAGO, ILLINOIS.

GOLD-SEPARATING MACHINE.

SPECIFICATION forming part of Letters Patent No. 690,791, dated January 7, 1902.

Application filed February 20, 1899. Serial No. 706,212. (No model.)

*To all whom it may concern:*

Be it known that I, BENJAMIN W. SWEET, a citizen of the United States, residing at Denver, in the county of Arapahoe and State of Colorado, have invented certain new and useful Improvements in Gold-Separating Machines, of which the following is a specification.

My invention relates to certain new and useful improvements in gold-separating machines; and its primary object is to effect a complete recovery of all the valuable parts of gold-bearing ores, and particularly to recover the very fine sulfurets which have heretofore been lost to a large extent.

Another object of the invention is to separate the coarser silica from the fine sulfurets before the latter pass to a concentrating-table, whereby said table is relieved of operating with the coarse material and can therefore be much closer adjusted to save the fine sulfurets; and a further object is to disintegrate and break up the slimes by a spray of water, so that the silica can be more readily and effectually separated, and to submerge the fine sulfurets for the purpose of facilitating the concentration thereof. This is particularly important with refractory ores carrying talc, mica, schist, galena, &c., which produce slimes of a pasty character, from which the fine particles of value cannot be readily separated until the mass is loosened up.

The process consists, broadly, in concentrating the slimes as they come from a battery-screen of a stamp-mill to separate the heavy gold and sulfurets from the slimes, then separately amalgamating the heavy gold and the tailings, which carry with them the fine gold and sulfurets, silica, and other base material, separating the coarse silica from the fine sulfurets, and finally concentrating the latter.

As the gold-bearing ores come from the battery-screen of a stamp-mill they are spread evenly and uniformly over the surface of a concentrating-table, which is so set that the heavy gold and sulfurets will be discharged from the high end thereof, owing to their greater specific gravity and the jarring or jolting action of the concentrating-table, while the tailings, carrying with them the float-gold, fine sulfurets, and silica, will pass off at the lower end of the concentrating-table. As both the concentrates and the tailings are subjected separately to amalgamating action, I am able to make the adjustment of the concentrating-table fine enough to effect a very perfect separation at this point. The concentrates are carried by a stream of fresh water introduced at this juncture over an amalgamating-plate to remove the greater part of the heavy gold and then fall upon the surface of an amalgamating cylinder or roll, where the separation of the free gold from the sulfurets is completed. The tailings fall from the lower end of this upper concentrating-table upon the surface of an amalgamating-cylinder, which removes the fine gold, and the remaining material is conveyed by a carrier to a sizing-table, which separates the coarse silica and other base material of a coarse grade from the finer particles, which pass on to a second or lower concentrating-table, where the fine sulfurets are saved. By separating the coarse material from the finer material after the tailings have passed the amalgamating-cylinder the second concentrating-table can be adjusted to operate in a much more effective manner, and thereby accomplish a more complete recovery of the finer particles of value. The sizing-table can be regulated to any grade and character of material, and a stream of water is directed on the material, when necessary, to dissolve it, so that the fine particles of value can be better separated and saved.

I have illustrated a machine by which my improved process can be carried into effect in the accompanying drawings, in which—

Figure 1 is a side elevation of the machine. Fig. 2 is a longitudinal sectional view. Fig. 3 is a top plan view.

Referring to the drawings, in which like characters of reference denote corresponding parts in all the figures, A designates the machine-frame, in which are mounted in a suitable way an upper concentrating-table B, an amalgamating-plate C, amalgamating-rolls D and E, a carrier F, a sizing-table G, and a lower or reconcentrating table H.

The slimes are brought from the battery-screen of a stamp-mill and distributed evenly and uniformly over the surface of the upper concentrating-table B, which is pivotally supported on the rods b, so that it can be vibrated in the desired manner. The concentrating-table is operated from the shaft I by means of tappets i, carried on the shaft, and which are arranged to strike the roller i' on the under side of the concentrating-table at each revolution of the shaft to carry the table backward against the action of the springs J, which in turn draw the concentrating-table forward with a jolt as the points of the tappets pass the roller i'. The upper concentrating-table is adjusted so that a very good separation of the slimes is effected, due to the different specific gravity of the ore carried thereby. The fine or float gold, with the silica and fine sulfurets, will flow down the table with the tailings, while the concentrates and the heavy gold are jolted forward on the table and finally discharged on the amalgamating-plate C. The scouring of the concentrates upon this table serves to remove the rust from the rusty gold and enables that gold to be caught and saved on the amalgamating-surfaces, over which they are subsequently passed. As I subject both grades of ore separately by the concentrator to an amalgamating action, I am able to so adjust the inclination of the table that a very complete separation of the silica from the concentrates is effected. The concentrates are washed off of the concentrating-table by a stream of water issuing from the feed-pipe K, which distributes the water across the upper end of the concentrating-table to carry the concentrates over the amalgamating-plate C, from which they fall upon the amalgamating-roll D. The free gold in the concentrates is mainly caught upon the amalgamating-plate C, and any remaining gold is removed from the concentrates by their passage over the amalgamating-roll D. As the water which carries the concentrates over the amalgamating-surfaces is fresh, a much cleaner amalgam is obtained than has heretofore been usual.

The lower concentrating-table H is constructed and arranged substantially in all respects similar to the upper concentrating-table B, being pivotally supported on the rods h, so that it can be vibrated by the tappets h' on the shaft L. The tappets engage a roller l on the table and carry the table backward against the spring l', which in turn draws the table forward with a jolt as the points of the tappets pass the roller l. The shafts I L are suitably geared together, one shaft having a belt-wheel M.

The tailings fall first upon a plate N and are distributed uniformly and evenly over the surface of the amalgamating-roll E, which takes up the larger part of the particles of gold. The tailings then fall upon the carrier F, which is supported in the frame to convey the tailings to the sizing-screen table G. This sizing-table is supported on the pivotal rods g, and it carries a roller g' in the path of the tappets h', so that the sizing-table will be drawn forward thereby against the spring O, which returns the table with a jolt after the points of the tappets have passed the roller g'. This sizing-table is arranged directly above the lower concentrating-table and beneath the discharge end of the carrier, the latter being provided with riffles f to catch any quicksilver from the roll E. In order to break up and disintegrate the pasty slimes, particularly of refractory ores, I provide a hose-nozzle P, connected with the water-supply pipe Q, which can be used to carry a stream of fresh water into the mass on the sizing-table, thereby effecting a more rapid and complete separation of the heavy particles from the lighter. The heavy grades are discharged from the lower end of the sizing-table into the waste-trough R, and the finer particles pass through the screens of the sizing-table onto the lower concentrating-table. By this means the lower concentrating-table is relieved from acting on the coarser particles, and hence it can be very closely adjusted to save the very fine particles of value. The sizing-table is composed of a frame in which one or more screens of any desired mesh are removably secured, and the construction is such that the adjustment of the sizing-table and lower concentrating-table and the mesh of the screens can be varied at will to suit different conditions. The fine sulfurets are forced through the screen by the spray of water, when such action is necessary by reason of the pasty character of the slimes, and the bumping and jolting action of the table onto the lower concentrating-table, where they are submerged in the water passing through the screen, whereby the separation of the fine particles of value, which are discharged at the high end of the concentrating-table into a concentrate-box, from the waste, which flows into the trough R, will be greatly facilitated, because the fine sulfurets being submerged the waste will largely float off the lower end of the concentrating-table. The sizing-screens not only separate the coarse silica from the fine concentrates, but they are located directly above the lower concentrating-table, so that the screens have an unobstructed delivery thereon and from a height sufficient to cause the particles to be submerged in the thin line of pulp on the table by the impact resulting from the fall directly thereon, and thus insure their recovery and prevent their being washed off.

It will be understood that my improved machine may be employed for the purpose of recovering other metals besides gold and also that changes in the form and proportions of parts may be made without departing from the spirit and scope of the invention.

Having thus fully described the invention, what I claim, and desire to secure by Letters Patent, is—

1. In a gold-separating machine, the combination with an inclined concentrating-table, and means for operating the same, of amalgamating-surfaces at each end of said table for receiving the heavier and lighter grades respectively, a lower inclined concentrating-table, sizing-screens located above said lower table for separating out the heavier grades and discharging the lighter concentrates with a fall sufficient to submerge them on the lower table, means for operating the lower table and the screens, and means for discharging the material passing from the amalgamating-surface which treats the lighter grades into the sizing-screens, substantially as described.

2. In a gold-separating machine, the combination with an inclined concentrating-table, and means for operating the same, of an amalgamating-roll at the tail end of said table, a lower inclined concentrating-table, sizing-screens located directly above the lower table and at a sufficient height to cause the particles discharged therefrom onto the lower table to be submerged in the pulp thereon by the impact of the fall, devices located between the lower table and the screens for imparting a bumping or jolting movement to the table and screens, and a carrier receiving the material discharged by the amalgamating-roll and conveying it to the screens, substantially as described.

BENJAMIN W. SWEET.

Witnesses:
D. P. McDONNELL,
H. F. PROBERT.